US006634606B2

(12) United States Patent
Heath

(10) Patent No.: US 6,634,606 B2
(45) Date of Patent: Oct. 21, 2003

(54) HANGER FOR FIRE SPRINKLER PIPE

(75) Inventor: Richard W. Heath, Yorba Linda, CA (US)

(73) Assignee: Tolco Incorporated, Corona, CA (US)

( * ) Notice: Subject to any disclaimer, the term of this patent is extended or adjusted under 35 U.S.C. 154(b) by 0 days.

(21) Appl. No.: 09/728,064

(22) Filed: Dec. 1, 2000

(65) Prior Publication Data

US 2002/0066836 A1 Jun. 6, 2002

(51) Int. Cl.[7] .................................................. F16L 3/12
(52) U.S. Cl. ........................................ 248/74.1; 248/62
(58) Field of Search ....................... 248/62, 74.1, 74.2, 248/313, 221.11, 222.13, 223.31, 231.31, 73

(56) References Cited

U.S. PATENT DOCUMENTS

| | | | | |
|---|---|---|---|---|
| 2,778,085 A | * | 1/1957 | Bernard .......................... 24/268 |
| 3,044,739 A | * | 7/1962 | Attwood ....................... 248/58 |
| 3,802,655 A | * | 4/1974 | Schuplin ....................... 248/62 |
| 5,297,890 A | * | 3/1994 | Commins ................... 248/74.1 |
| 5,344,108 A | * | 9/1994 | Heath .......................... 248/300 |
| 5,839,703 A | * | 11/1998 | Tesar .............................. 248/65 |
| 6,010,099 A | * | 1/2000 | Wertz et al. .................... 248/53 |
| 6,138,960 A | * | 10/2000 | Carbonare et al. ............. 248/62 |
| 6,241,199 B1 | * | 6/2001 | Ismert ............................ 248/56 |
| 6,409,135 B1 | * | 6/2002 | Roberts .................. 248/229.15 |
| 6,508,440 B2 | * | 1/2003 | Schmidt ........................ 248/62 |
| 2002/0066834 A1 | * | 6/2002 | Choi ............................. 248/65 |
| 2002/0066836 A1 | * | 6/2002 | Heath ......................... 248/74.1 |
| 2002/0100843 A1 | * | 8/2002 | Schmidt ........................ 248/72 |
| 2003/0080260 A1 | * | 5/2003 | Buck ............................. 248/58 |

FOREIGN PATENT DOCUMENTS

JP          05086687 A   *   4/1993

* cited by examiner

Primary Examiner—Kimberly Wood
Assistant Examiner—Naschica S. Morrison
(74) Attorney, Agent, or Firm—Knobbe, Martens, Olson & Bear, LLP

(57) ABSTRACT

A hanger for attaching pipe used in fire protection sprinkler systems to structural framing members. The hanger is substantially horseshoe shaped, the pipe being held in the arched section of the hanger by snapping it between protrusions formed on either side of the arch. A support web positioned in slots in the hanger legs restrains movement of the pipe in the event of a strong surge caused by a sudden release of water pressure.

5 Claims, 5 Drawing Sheets

HANGER FOR FIRE SPRINKLER PIPE

BACKGROUND OF THE INVENTION

1. Field of the Invention

This invention relates in general to fire protection sprinkler systems, and specifically to a hanger for attaching piping to structural members for use in fire protection sprinkler systems.

2. Description of the Related Art

Typically in automatic fire sprinkler systems, pipe is run in concealed spaces which are made by the framing members of the particular structure in which the system is being installed. In order to avoid excessive drilling of holes through structural members in order to run the pipe, installers generally attempt to run the pipe in the natural channels which parallel the structural members. This space is generally above the finished ceiling visible to the building occupant. This finished ceiling, which is generally attached to the bottom of the structural members, is typically fabricated from a relatively soft sheet-rock or fiberglass tile.

Thus it is desirable to have a hanger which will attach to a structural member and hold the pipe in place. Such pipe hangers have been developed in the past. These however, generally clamp the pipe flush with the structural members. This is a problem, because the necessary adapter fitting which is positioned between the pipe end and the sprinkler head is of a larger diameter, and thus does not allow the sprinkler head to fit in a correct installation when the pipe is mounted flush against the structural member.

The pipe and adapter need to be offset from the structural members in order to allow space for the adapter and sprinkler head to sit properly. This is typically accomplished by attaching blocks of wood between the structural members and the hanging brackets. Unfortunately, a significant amount of time and effort is required to attach the blocks to the structural members, and then the hangers to the blocks. Additionally, this requires the installer to have a sufficient number of wood blocks on hand. It is also quite time consuming to attach a wood block, and then attach a pipe via a bracket.

Another concern in the installation of such sprinkler systems is the possibility of a surge when the water pressure is suddenly released. This surge could be strong enough to cause the sprinkler head to push through the relatively soft sheet rock of the finished ceiling and spray water above the sheet rock, thus rendering the sprinkler useless in putting out a fire below the level of the visible ceiling. In fact, an industry standard exists which requires a fire sprinkler installation to withstand an upward surge of at least 340 pounds. There is presently no single device which will perform both functions of holding the pipe offset from a structural member as well as providing support against a possible surge.

SUMMARY OF THE INVENTION

It is therefore an object of the present invention to provide a pipe hanger for a fire protection sprinkler system pipe, capable of holding the pipe a significant distance away from the structural members to which it is attached without the use of wood blocks or other superfluous parts. It is another object of the present invention to provide a pipe hanger with an incorporated surge-protecting component. It is yet another object of the present invention to provide a pipe hanger with improved ease of installation.

A hanger having features and advantages of the present invention is preferably formed from a single piece of sheet metal bent into a substantially horseshoe shape. The hanger is adapted such that it can hold a pipe of a given diameter a substantial distance from the structural members to which it is attached. The pipe is generally held in place within the hanger by dimples in the outer surface of the hanger which are located such that the pipe snaps into the space between the dimples and the arch.

The hanger may be attached to the structural members by the use of screws, bolts, rivets, or any other appropriate attachment methods known to those skilled in the art. The present invention has the advantage that relatively few parts are required to attach pipes to structural members. The present invention also provides relatively lightweight parts which can be carried more easily than a collection of wood blocks.

A hanger having features and advantages of the present invention may also incorporate a removable surge-restraining web or support intended to support the pipe in the event of a sudden release of water through the sprinkler head. By supporting the pipe, the sprinkler head will be retained below the level of the visible ceiling in the event of such a surge. As described below, the web is capable of providing additional support to the hanger in whatever orientation it is mounted.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which.

DETAILED DESCRIPTION OF THE PREFERRED EMBODIMENT

Figure 1:
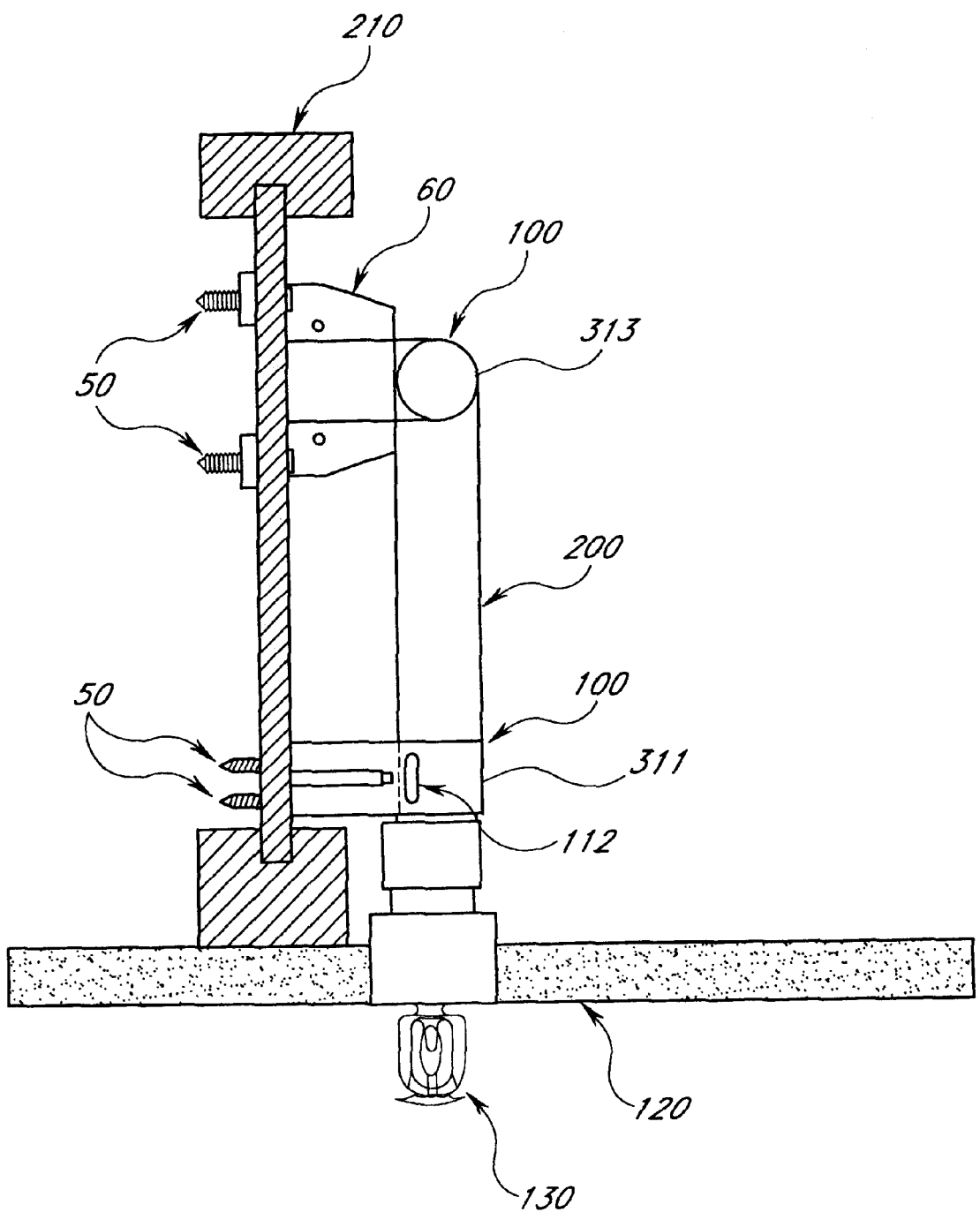
FIG. 1 is an end view of a structural member to which is attached a fire protection sprinkler system using hangers having features and advantages of the present invention.
Figure 2:
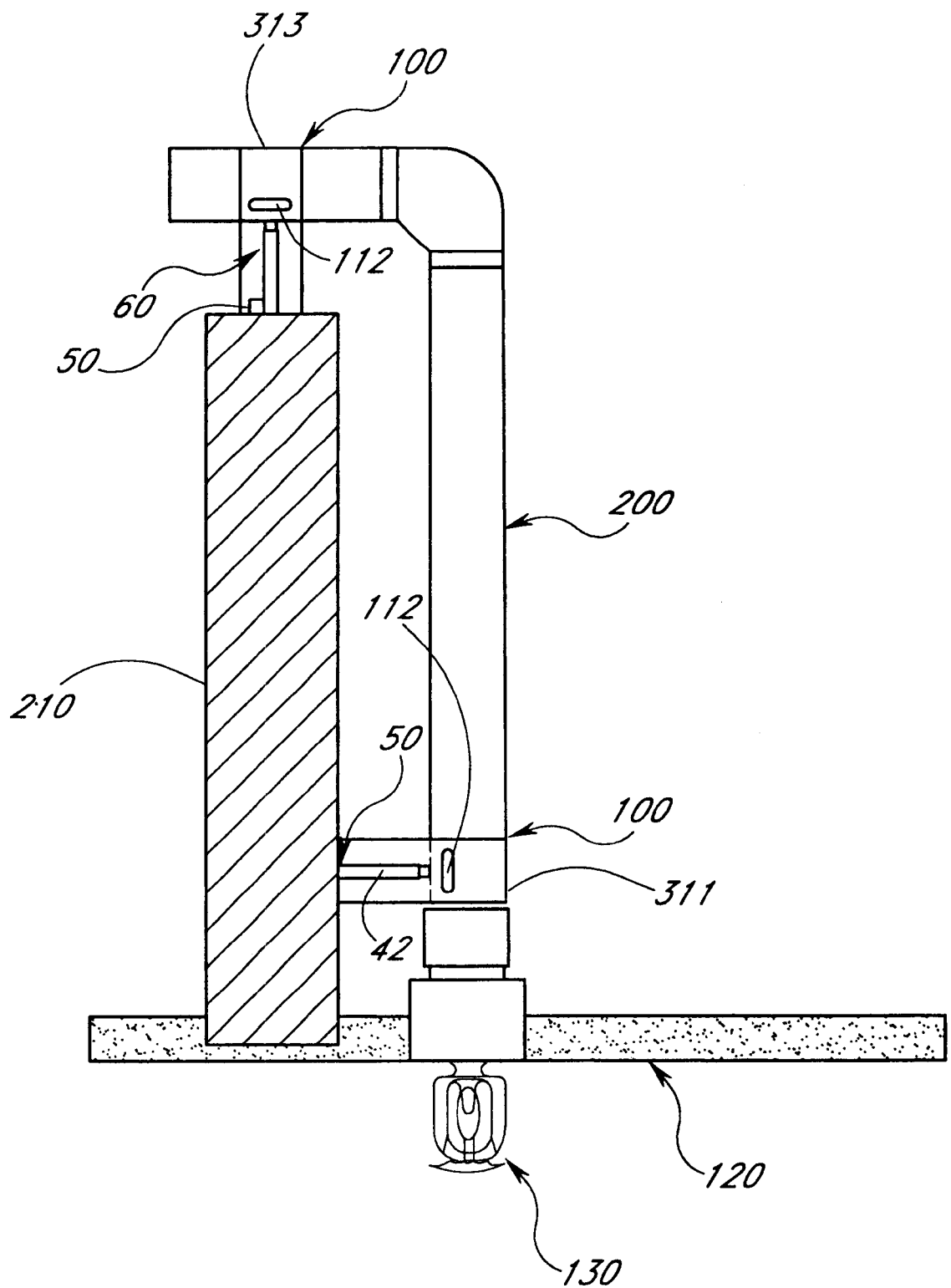
FIG. 2 is a section of an alternative installation of a fire protection sprinkler system using hanger assemblies of the present invention.

FIGS. 1 and 2 show a typical fire protection sprinkler installation using components having features and advantages of the present invention. A pipe 200 is held substantially fixed to a structural member 210 by way of a plurality of pipe hanger assemblies 100. The hanger 100 shown in the upper position 313 has a support web 60 removably mounted thereto. The web 60 is adapted such that it offers support in the event of an upward surge due to a sudden release of water through the sprinkler head 130, thus preferably restraining the sprinkler head 130 from being pulled through the relatively soft sheet rock 120 to a point above the level of the visible ceiling 120. The hanger 100 in the lower position 311 preferably holds the pipe 200 in place a substantial distance from the structural member 210 by dimples 112 formed in the hanger 100 as described below.

As seen from FIGS. 3, 6 7 and 8, the hanger 100 is substantially horseshoe-shaped, having a pair of spaced substantially parallel legs 17 defining an open end with each leg having an outwardly extending flange 16 on the open end. The opposite ends of the legs are joined by a closed end wall 18, preferably having an arch shape, curving in substantially a half circle so as to form a space for receiving a round sprinkler pipe. The hanger is preferably formed of a flat strip of metal bent into the illustrated shape.

Dimples 112 are formed in the exterior of each of the legs 17 close to the closed end 18. The dimples thus protrude inwardly in a location such that they form protrusions or projections that will hold a pipe 200 in place adjacent the end wall 18. The protrusions preferably extend across most of the width of the relatively wide hanger legs 17 to provide line contact with a pipe rather than just point contact. While a pipe could be held in place within the hanger 100 by other means, the dimpled technique is particularly convenient because the hanger can be slipped over a pipe or a pipe slipped into a hanger and held in place without any other fasteners, except those that will extend through the flanges into a support structure. Also, the dimples are easily stamped into a strip of metal during the bending and cutting of the hanger. In accordance with the invention, the length of the legs is greater than the diameter of the pipe 200, and the dimples 112 are located on the legs so that the pipe is spaced substantially from the flanges. This enables a pipe to be spaced from or stand off from a support structure.

The hanger legs 17 are each formed with an elongated slot 42 that extends from the flange 16 to a position slightly spaced from the dimples. As seen, the slots are relatively narrow in width so that the hanger legs 17 are not unduly weakened. Note also that the slots are preferably centrally positioned within the legs. In a preferred manufacturing technique, the slots are formed by punching, and this creates elongated lips or flanges 40 that provide additional strength. The lips preferably protrude outwardly to avoid interference by the lips when sliding a hanger onto a pipe.

Figure 3:
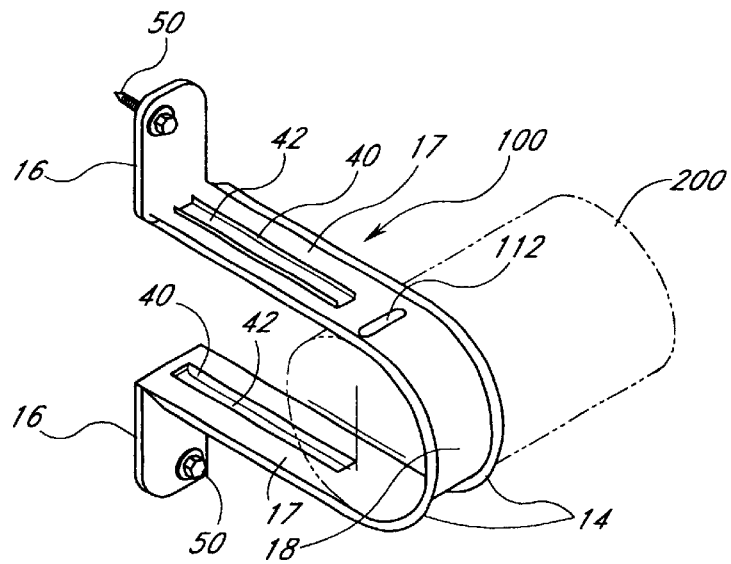
FIG. 3 is an orthogonal view of a hanger of the present invention.
Figure 4:
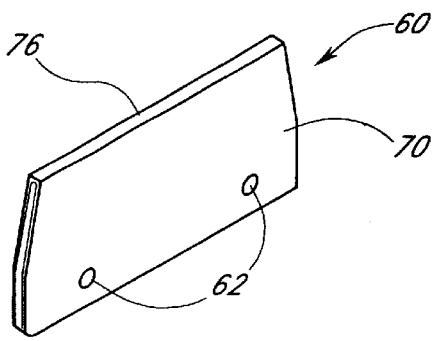
FIG. 4 is an orthogonal view of a support web of the present invention.
Figure 9:
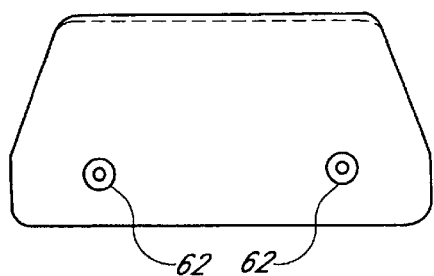
FIG. 9 is a side view of a support web of the present invention.
Figure 10:
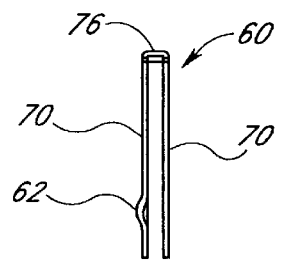
FIG. 10 is an end view of the web of FIG. 9.
Figure 7:
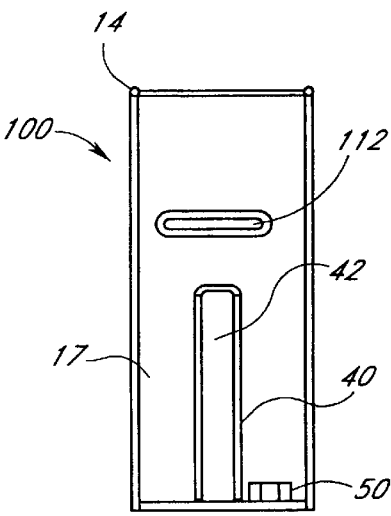
FIG. 7 is a side view of the hanger of FIG. 6.
Figure 12:
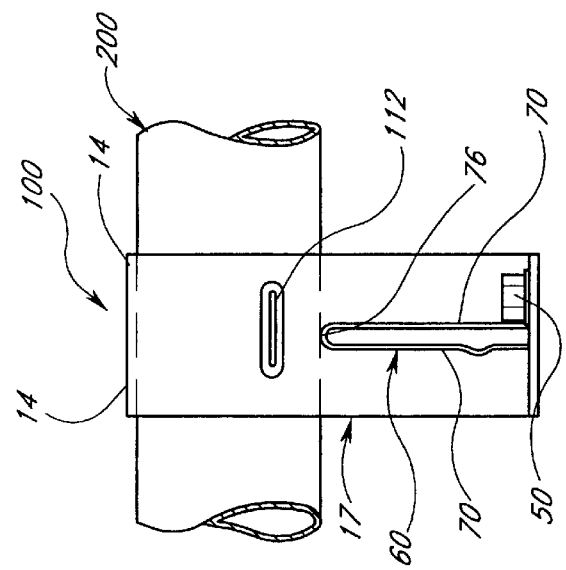
FIG. 12 is a side view of the assembly of FIG. 11.
Figure 13:
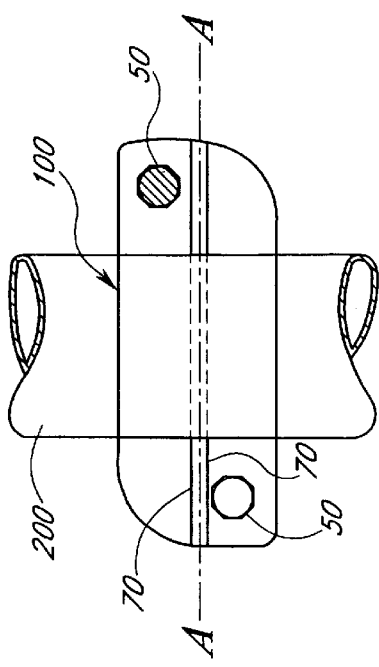
FIG. 13 is a top view of the assembly of FIG. 11.
Figure 11:
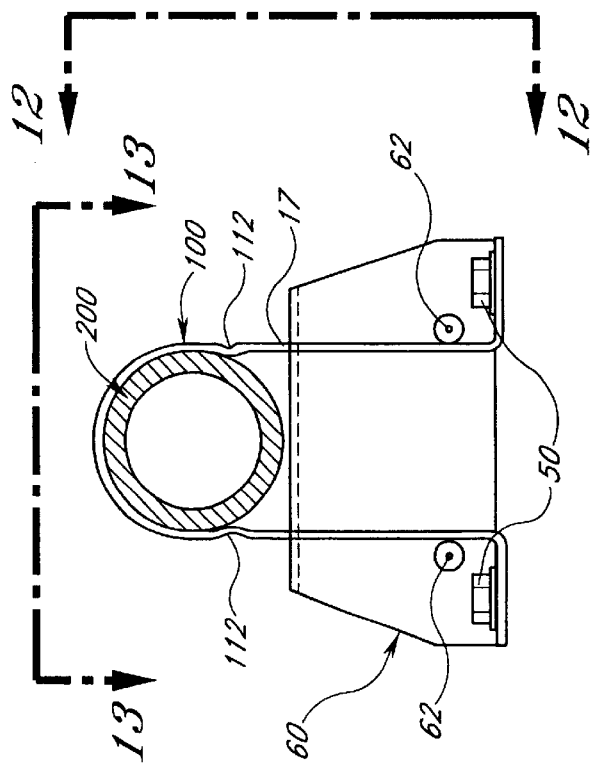
FIG. 11 is an end view of a hanger, web and pipe assembled of the present invention.

A support web 60, as shown in FIGS. 4, 9, and 10, is insertable into the slots 42 of the hanger 100 (FIG. 7). The web has an elongated, substantially U-shaped cross-section. The web is bent into the form shown which creates a smoothly curved closed end with closely spaced substantially parallel legs. The narrow profile enables the web to extend through the narrow slots 42. Also, the close spacing of the legs enhances the web support strength. When viewed from the side, the web has a substantially trapezoidal shape although it could be substantially rectangular or otherwise shaped so long as it functions as described herein. The width of the web is preferably about equal to the width of the hanger, as measured from the outer ends of the flanges 16. A pair of dimples or protrusions 62 are formed in at least one leg 70 of the web 60. The dimples protrude outwardly, away from the outer surface of the legs. The protrusions are spaced a distance from each other slightly more than the distance between the outer edges of the slot lips 40 such that the protrusions hold the web in place within the pipe hanger, as shown in FIGS. 3, 11, and 12. In use, the web is to be inserted into a slot 42 with the curved closed end 76 of the web positioned adjacent the dimples 112 in the hanger legs, with the open ends of the legs engaging the hanger flanges 16 so that the smooth closed end of the web is adjacent the pipe to be restrained. The web protrusions 62 are located so that the web is centrally positioned within the hanger 100. The hanger is preferably formed of a flat strip of metal bent into the illustrated shape.

Referring to FIGS. 1 and 2, a sudden release of water pressure through the sprinkler head 130 will produce a force on the sprinkler head 130 in the direction opposite to the flow of the water. This force, or surge, will likely act in such a direction that it will drive the sprinkler head 130 and pipe 200 upward. The web 60 adds stiffness to the hanger 100 with which it is used such that it is able to restrain the pipe 200 from a force of up to 340 pounds as required by an industry standard. The web receives the entire load in some arrangements.

Obviously, the specific loading conditions of any given hanger 100 will depend greatly on its specific orientation relative to the other hangers 100 and the sprinkler head(s) 130 (FIGS. 1 and 2), which make up the fire protection system. As an example, FIG. 1 shows a section of an installed sprinkler system. In this section, a web 60 is used in the hanger 100 in the upper position 313 and serves to brace the hanger 100 from bending upwards, thus insuring that the sprinkler head 130 remains below the level of the visible ceiling 120. Similarly, FIG. 2 shows a section of an alternative sprinkler system in which the web restrains movement.

Figure 8:
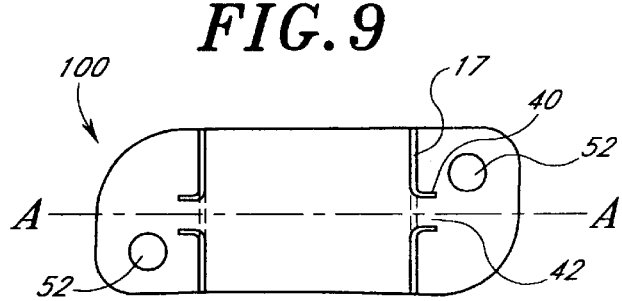
FIG. 8 is a top view of the hanger of FIG. 6.
Figure 6:
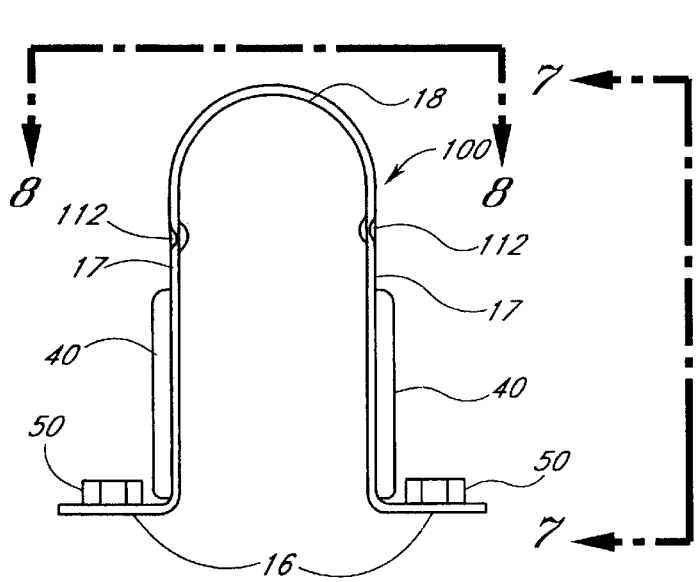
FIG. 6 is an end view of the hanger of FIG. 5.

As shown in FIG. 8, the attachment flanges 16 of the hanger 100 preferably comprises fastener holes 52 on either side of the centerline A—A so as to allow for space between the head of the fastener 50 and the web 60 (as shown in FIG. 12). Referring to FIGS. 1 and 2, the type of fastener 50 used should be determined by the particular structural member 210 to which the hanger 100 is to be attached. Such fasteners 50 may include for example, bolts, screws, rivets, etc. In the arrangement of FIG. 1, the hangers are attached to composite wood, and hence, bolts with fasteners 50 on the ends are desired. As seen from FIG. 8, the fasteners are off-set from the hanger slots so as not to interfere with the insertion of the web into the slots. They are off-set in opposite directions with respect to the slots to provide adequate support with only two fasteners.

A hanger 100 having features and advantages of the present invention is preferably formed by punching the basic features into a sheet of #20 gauge (approximately 0.035" thick) pre-galvanized carbon steel, then bending it into the preferred shapes shown and described herein. One of skill in the art will recognize, however, that such a hanger may also be created by other processes such as machining or casting, or from other materials such as plastic or wood.

Figure 5:
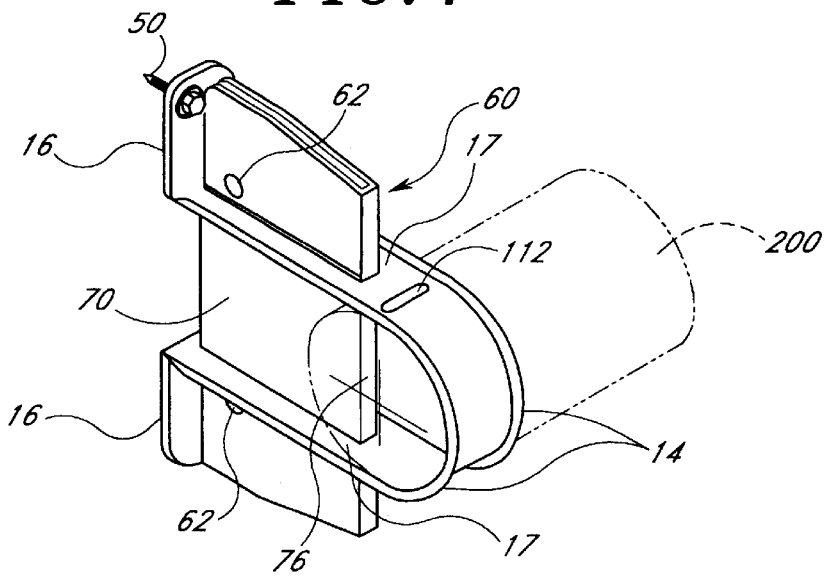
FIG. 5 is an orthogonal view of the web of FIG. 4 assembled with the hanger of FIG. 3.

A hanger 100 having features and advantages of the present invention is especially adapted for use with plastic CPVC pipe which is typically used in fire sprinkler installations, however it may be used with any other type of pipe with which it is compatible. As shown in FIGS. 3, 5 and 12, the edges 14 of the hanger 100 are preferably flared upwards such that the sharp corners of the metal will not come into contact with and cut into a plastic pipe. Similarly, the top portion 76 of the web 60 which may contact the pipe 200 is rounded in order to protect the plastic pipe from being damaged by sharp metal edges.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A pipe hanger assembly for positioning a pipe spaced from a support, comprising:

a pipe hanger having a pair of spaced legs with closed ends joined by an end wall to define a space for receiving a pipe, said legs having open ends opposite from said closed ends configured to be attached to a support, said legs each having a slot formed therein; and a support configured to fit within said slots to span the distance between said legs, the slots being located so that the support restricts movement of a pipe in said space towards said open leg ends;

wherein said slots have an elongated configuration extending from said open ends toward said space; said support has a generally flat configuration sized to fit within said slots; and said support has a narrow U-shaped configuration having two substantially parallel legs joined on one end by a curved end wall, with the opposite ends of the support legs being spaced from each other.

2. The assembly of claim 1, wherein said support closed curved end has an outer smoothly curved surface for engaging a pipe to be positioned in said space.

3. The assembly of claim 1, wherein at least one of said support legs has a pair of projections which are spaced a distance greater than the distance between said hanger legs so that said projections help to centrally position the support with respect to the hanger legs.

4. The assembly of claim 1, wherein said hanger legs have inwardly projecting protrusions located to support a pipe in said space.

5. A pipe hanger assembly for positioning a pipe spaced from a support, comprising:

a pipe hanger formed of a flat strip of metal bent into a U-shape with an open end of the U being defined by a pair of spaced legs having outwardly extending flanges for mounting the hanger on a support, said hanger having an arched closed end curving substantially in a half circle to define a space for receiving a pipe having a round cross-section, portions of said legs extending inwardly to hold a pipe within the space formed by said arched closed end, said portions being spaced from said flanges a distance greater than the diameter of said half circle, an elongated slot in each leg extending from said flanges to a location adjacent said space; and a support having an elongated U-shaped configuration sized to fit within said slots, one edge of the support being positioned adjacent a pipe to fit within the hanger while an opposite end of the support is adjacent said flanges whereby movement of a pipe towards the flanges is blocked by the support.

\* \* \* \* \*